United States Patent
Kaneyasu et al.

(10) Patent No.: US 8,266,983 B2
(45) Date of Patent: Sep. 18, 2012

(54) DAMPER SPRING DEVICE, FLYWHEEL, CLUTCH DISK, AND CLUTCH DISK FOR LOCKUP MECHANISM

(75) Inventors: Mitsutoshi Kaneyasu, Kamiina-gun (JP); Kazuo Iwata, Yokohama (JP); Nobuharu Kato, Ina (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 13/020,995

(22) Filed: Feb. 4, 2011

(65) Prior Publication Data
US 2011/0132137 A1 Jun. 9, 2011

Related U.S. Application Data

(63) Continuation of application No. PCT/JP2009/064044, filed on Aug. 7, 2009.

(30) Foreign Application Priority Data

Aug. 8, 2008 (JP) .................................. 2008-206038

(51) Int. Cl.
*F16F 15/12* (2006.01)
(52) U.S. Cl. ...................................... 74/574.4
(58) Field of Classification Search ................ 74/572.2, 74/573.12, 573.1, 574.4; 464/51, 61.1, 64.1, 464/68.4, 68.41, 68.8; 192/212, 213, 213.1
See application file for complete search history.

(56) References Cited

U.S. PATENT DOCUMENTS

| 4,645,054 | A | * | 2/1987 | Raab ........................ 192/213.11 |
| 6,547,612 | B1 | * | 4/2003 | Bader ............................. 440/75 |

FOREIGN PATENT DOCUMENTS

| JP | 34-13828 Y1 | 9/1959 |
| JP | 50-85751 A | 7/1975 |
| JP | 62-75139 | 5/1987 |
| JP | 2-9208 B2 | 3/1990 |
| JP | 4-73631 U | 6/1992 |
| JP | 04370451 A | * 12/1992 |
| JP | 2000-24705 A | 9/2000 |
| JP | 2002-507707 A | 3/2002 |
| JP | 2005-195119 A | 7/2005 |

OTHER PUBLICATIONS

Japanese Office Action dated Jul. 12, 2011 (and English translation thereof) in counterpart Japanese Application No. 2008-206038.
International Search Report and Written Opinion dated Oct. 6, 2009 (in English) in counterpart International Application No. PCT/JP2009/064044.

* cited by examiner

*Primary Examiner* — Vicky Johnson
(74) *Attorney, Agent, or Firm* — Holtz, Holtz, Goodman & Chick, PC

(57) ABSTRACT

A damper spring device is provided with a first spring and a second spring retained by a stopper in such a manner that the second spring is compressed by a preload. The preload on the second spring is greater than a preload on the first spring. The first spring and the second spring have load-deflection characteristics such that the first spring deforms when an axial load acting in the direction of compression of the first spring is not greater than a load at which a strand of the first spring is at least partially compacted and that the first spring and the second spring deform when the axial load is greater than the load at which the strand of the first spring is at least partially compacted.

13 Claims, 12 Drawing Sheets

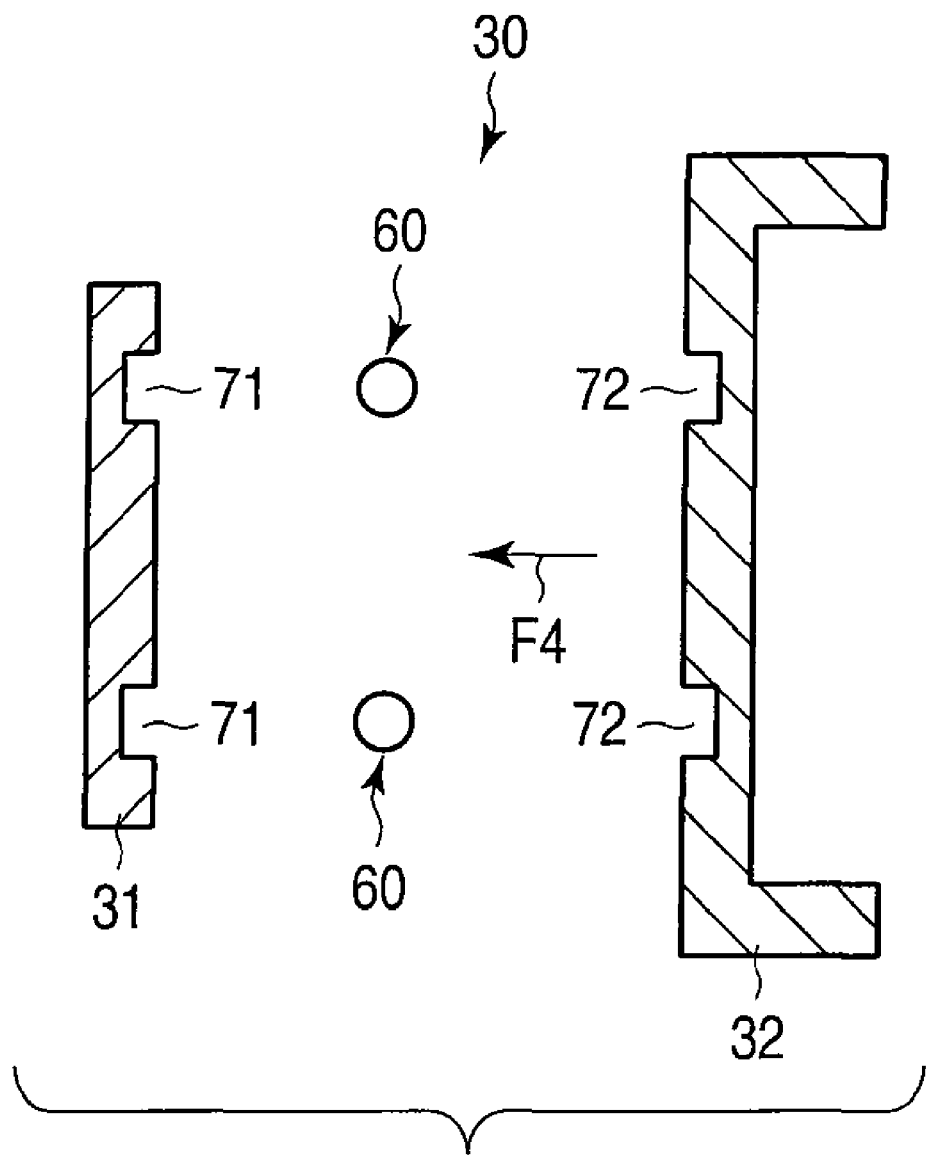
F I G. 2

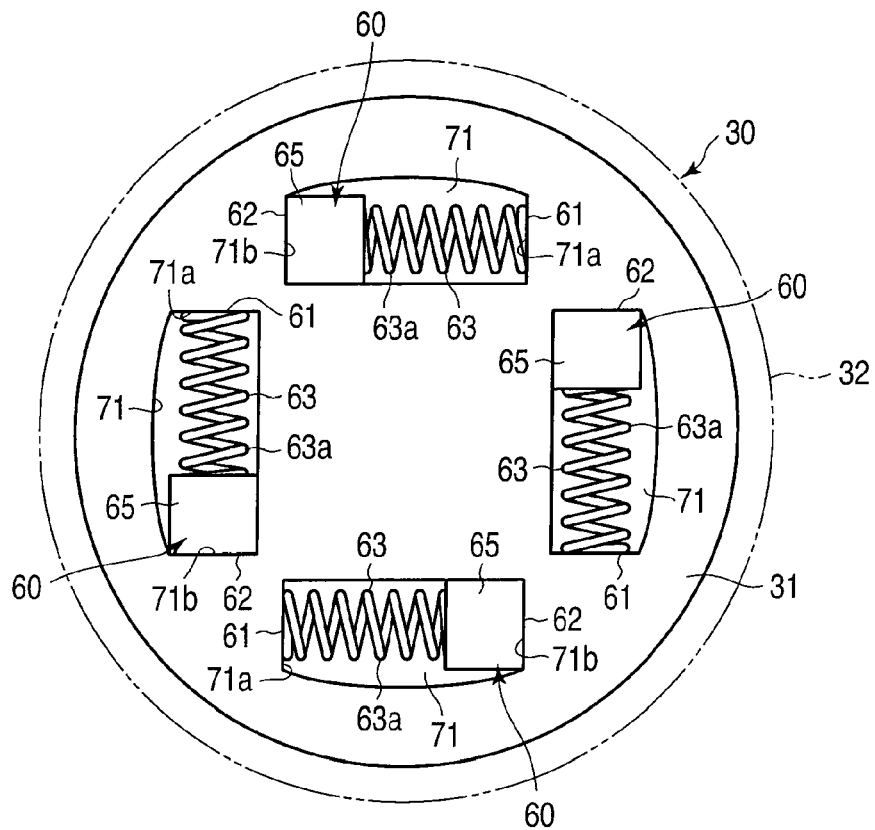
F I G. 4
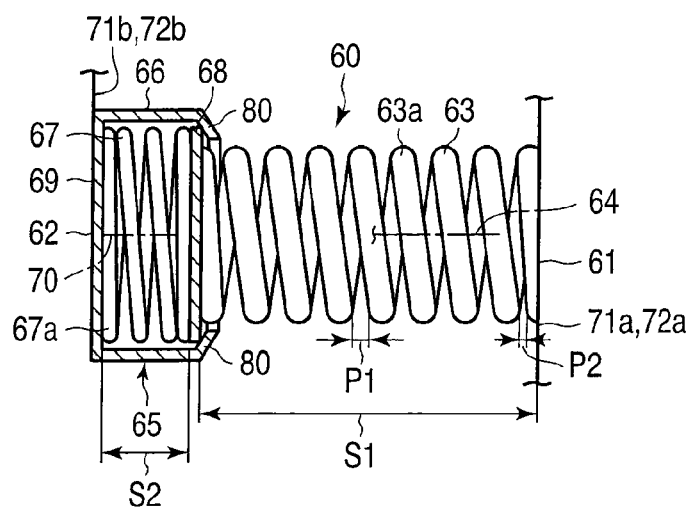
F I G. 5

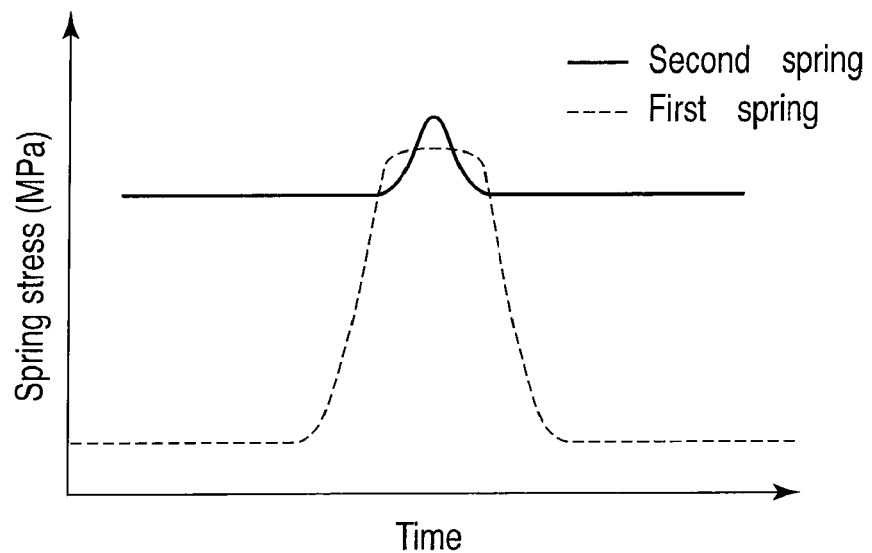
F I G. 8
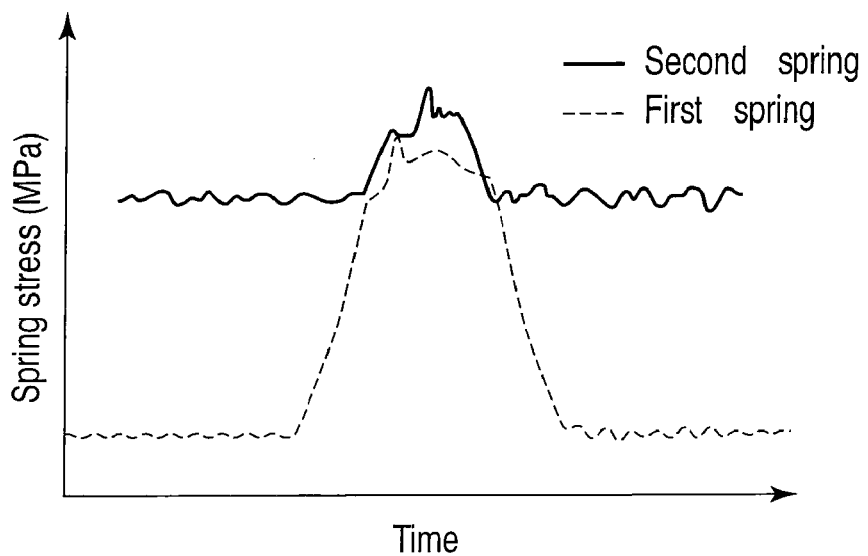
F I G. 9

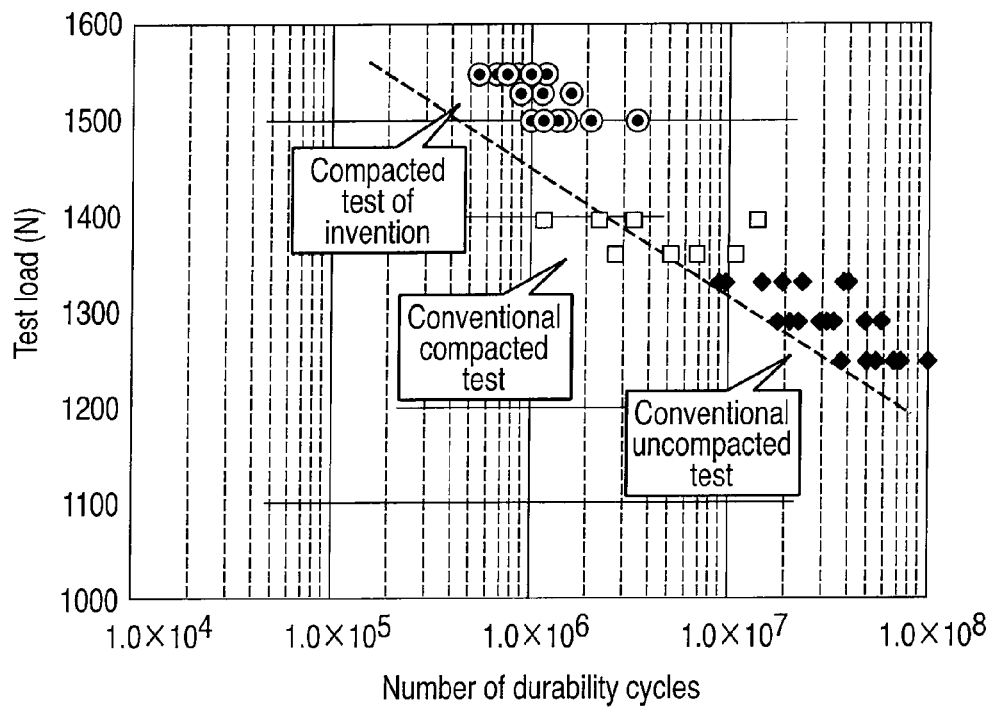
F I G. 10
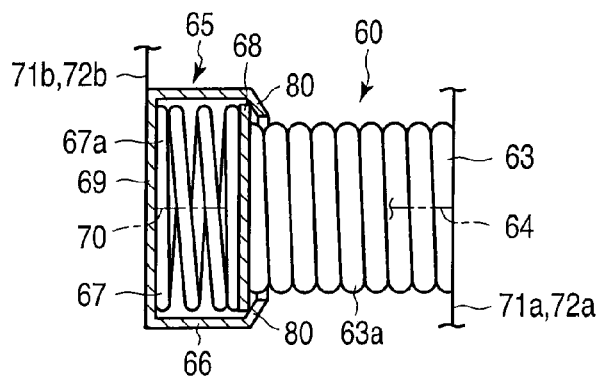
F I G. 11

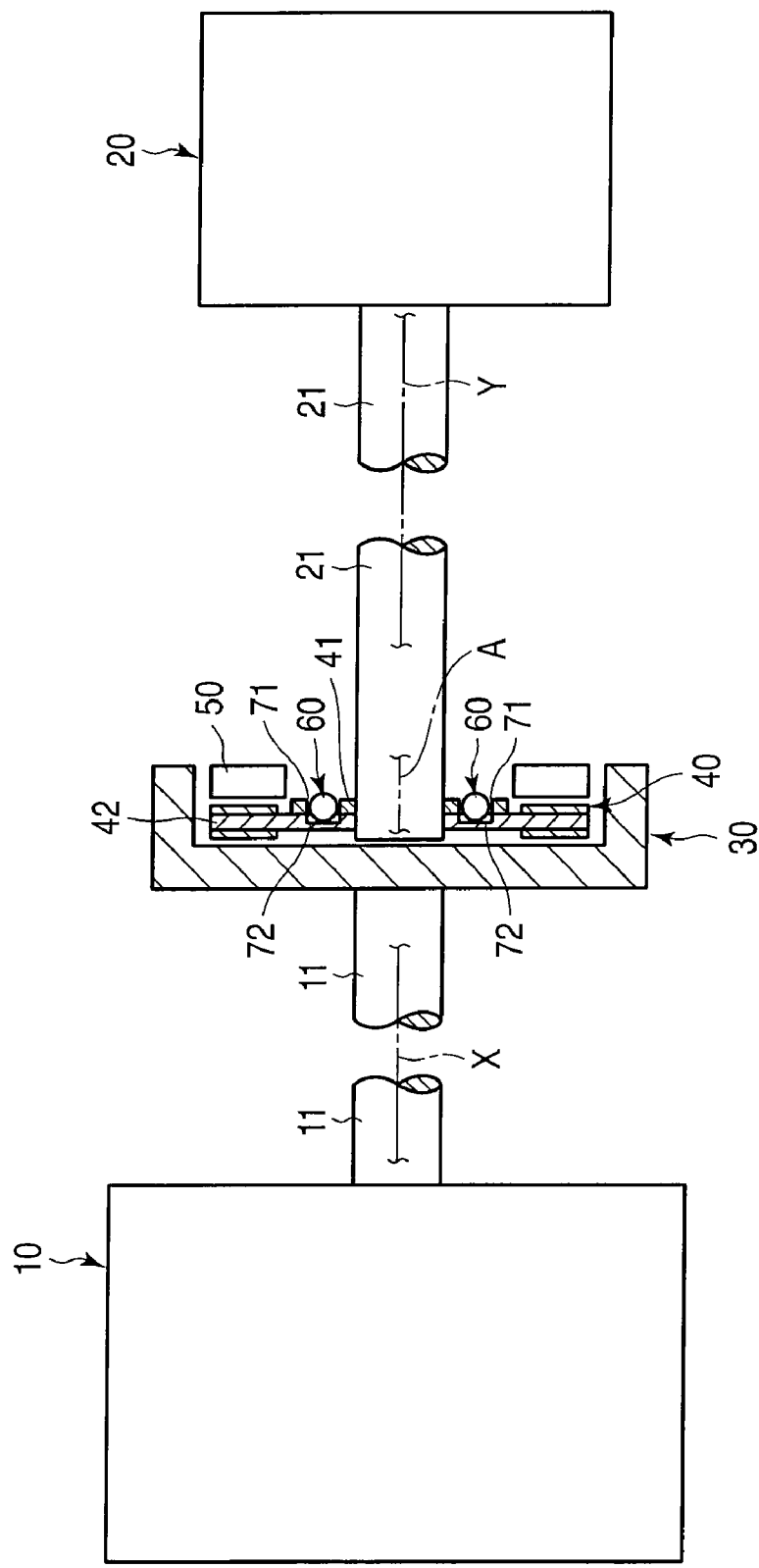
F I G. 21

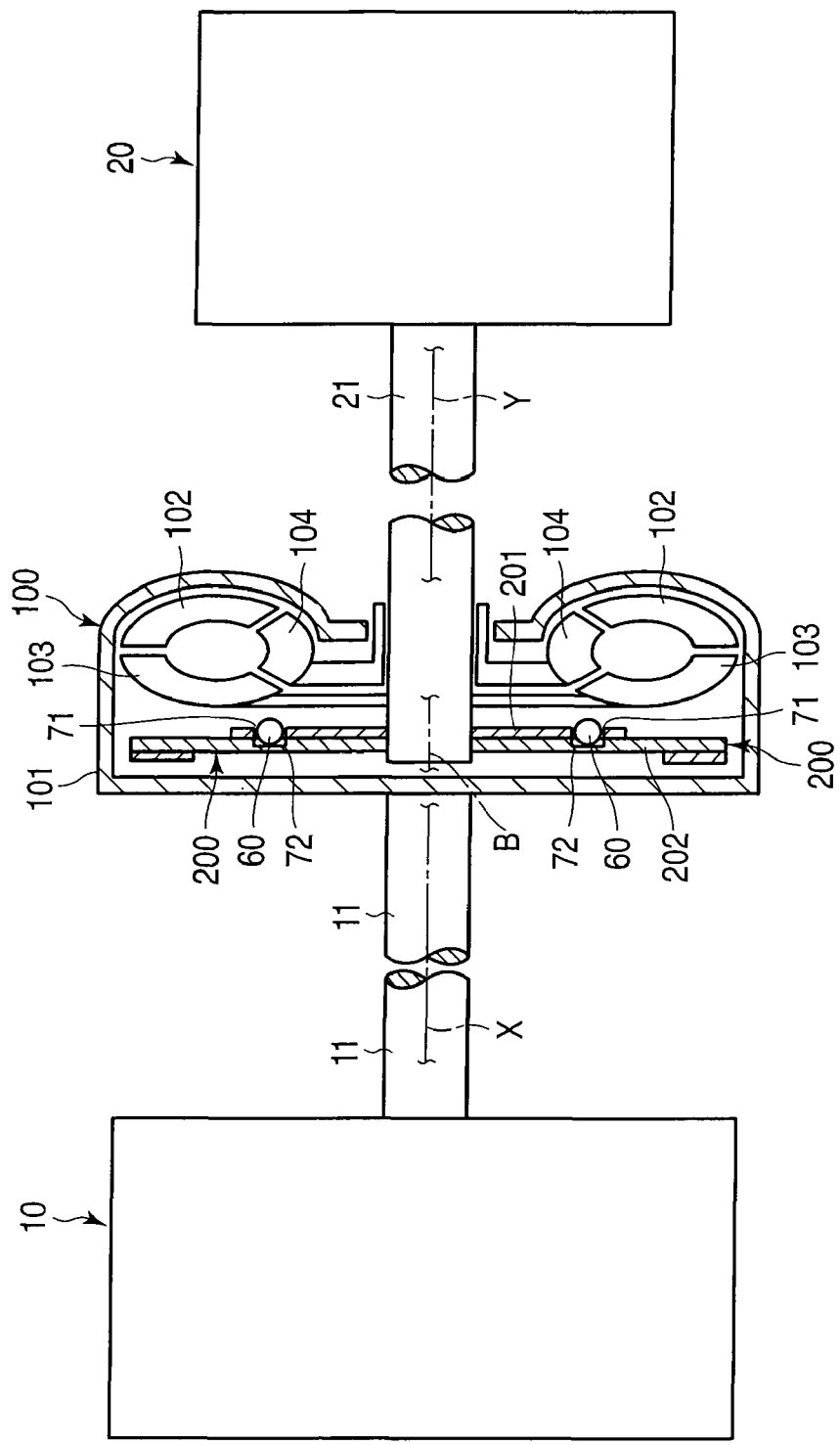
F I G. 22

DAMPER SPRING DEVICE, FLYWHEEL, CLUTCH DISK, AND CLUTCH DISK FOR LOCKUP MECHANISM

CROSS REFERENCE TO RELATED APPLICATIONS

This is a Continuation Application of PCT Application No. PCT/JP2009/064044, filed Aug. 7, 2009, which was published under PCT Article 21(2) in Japanese.

This application is based upon and claims the benefit of priority from prior Japanese Patent Application No. 2008-206038, filed Aug. 8, 2008, the entire contents of which are incorporated herein by reference.

BACKGROUND OF THE INVENTION

1. Field of the Invention

The present invention relates to a technique used for a damper spring device in a transmission unit for transmitting engine power to a transmission in, for example, an automobile. Further, the present invention relates to a flywheel comprising the damper spring device. Moreover, the present invention relates to a clutch disk comprising the damper spring device. Furthermore, the present invention relates to a clutch disk for lockup mechanism comprising the damper spring device.

2. Description of the Related Art

Conventionally, in a manual automobile, rotation of the crankshaft of an engine is transmitted to a transmission as a clutch disk on an end portion of an input shaft of the transmission is pressed against a flywheel on an end portion of the crankshaft by a pressure plate.

However, a sudden torque change may occur depending on the operating state of the engine. In this case, the flywheel and clutch disk are connected so that the torque change is transmitted to the transmission.

If the sudden torque change is transmitted to the transmission, it causes various types of gears in the transmission to produce rattling noise. To overcome this, the clutch disk is provided with, for example, damper spring devices that can absorb the sudden torque change.

Specifically, the clutch disk comprises, for example, two disks. One of the disks is connected to the shaft of the transmission. The other disk is supported on the one disk so as to be rotatable around the crankshaft and the rotary shaft of the transmission. The other disk is supported for rotation relative to the one disk and releasably pressed against the flywheel. The damper spring device is disposed between the one and other disks and elastically supports the rotational displacement of the one disk relative to the other disk.

In the clutch disk constructed in this manner, if a sudden torque change occurs when the other disk is pressed against the flywheel, the other disk is rotationally displaced relative to the one disk, and this rotational displacement is absorbed by the damper spring device. In this way, a sudden torque change of the engine can be absorbed.

An example of the damper spring device used in this manner comprises, for example, an arcuate coil spring, and this coil spring has two types of turns of different diameters, large and small. According to the damper spring device of this type, relative rotation of the other disk is stopped as the turns of a coil strand are brought into fully close contact with one another, and impact attributable to the sudden torque change is absorbed by friction between the turns of the fully compacted strand with the large and small diameters (e.g., Jpn. PCT National Publication No. 2002-507707).

Further proposed is a structure that comprises two types of spring mechanisms configured to absorb impact. These two types of spring mechanisms sequentially operate depending on the magnitude of the impact (e.g., Jpn. Pat. Appln. KOKOKU Publication No. 2-9208). In the structure of this type, the two types of spring mechanisms have two-phase load characteristics.

However, the structure disclosed in Jpn. PCT National Publication No. 2002-507707 is a structure in which the large- and small-diameter turns contact one another and produce friction as they slide radially inward and outward relative to one another, thereby attenuating the impact. Therefore, the spring may be broken by bending stress in a direction such that the coil is spread.

Further, the structure disclosed in Jpn. Pat. Appln. KOKOKU Publication No. 2-9208, which comprises the two types of spring mechanisms, is complicated. According to Jpn. PCT National Publication No. 2002-507707 and Jpn. Pat, Appln. KOKOKU Publication No. 2-9208, furthermore, surging may occur as the impact attributable to the torque change is absorbed, and this surging may be influential.

On the other hand, a buffer is proposed in which two types of coil springs are arranged in series. In this buffer, the two types of coil springs are arranged in series so that an input load can be absorbed as one of the coil springs is contracted. Then, a heavier load can be absorbed as the other coil spring is contracted (e.g., Jpn. UM Appln. KOKOKU Publication No. 34-13828).

Thus, the buffer described above can obtain two-phase load characteristics by means of the relatively simple structure in which the two types of coil springs are arranged in series.

Also in the buffer disclosed in Jpn. UM Appln. KOKOKU Publication No. 34-3828, however, the coil spring may be damaged (e.g., broken) by friction between the turns of the coil spring. Further, surging may occur as the torque change is absorbed, and this surging may be influential.

BRIEF SUMMARY OF THE INVENTION

The object of the present invention is to provide a damper spring device capable of suppressing breakage and the influence of surging.

A damper spring device according to an aspect of embodiments is provided between an output shaft of an engine and an input shaft of a gearbox. The damper spring device comprises a first spring comprising a coil spring and deformable in a rotational direction of the output shaft of the engine and the input shaft of the gearbox, and a second spring located in series with the first spring, on one side of the first spring, capable of being compressed along an axis of the first spring, and configured to be retained by a stopper in such a manner that the second spring is compressed by a preload along the axis. The preload on the second spring is greater than a mounting load of the first spring. The first spring and the second spring have load-deflection characteristics such that the first spring deforms when an axial load acting in the direction of compression of the first spring is not greater than a load at which a strand of the first spring is at least partially compacted and that the first spring and the second spring deform when the axial load is greater than the load at which the strand of the first spring is at least partially compacted.

In a preferred form of embodiments, the preload on the second spring is set so that the second spring deforms when a load at which the strand of the first spring is fully compacted is exceeded by the axial load.

In a preferred form of embodiments, the second spring is a coil spring.

In a preferred form of embodiments, the second spring is a disk spring.

In a preferred form of embodiments, the second spring is a nonmetallic elastic member.

In a preferred form of the present invention, a third spring is provided which is capable of being compressed along the axis of the first spring on the opposite side of the first spring to the second spring and configured to be retained by a stopper in such a manner that the third spring is compressed by a preload along the axis. The preload on the third spring is greater than the mounting load of the first spring and set so that the third spring deforms the moment the second spring starts to deform or after the second spring starts to deform.

A flywheel according to an aspect of embodiments includes the damper spring device described above. Further, the flywheel comprises a first portion, secured to the output shaft of the engine and configured to rotate integrally with the output shaft, and a second portion which is supported on the first portion so as to be pivotable relative to the first portion around an axis of the output shaft of the engine and against which the input shaft side of the gearbox is releasably pressed. The damper spring device is disposed spanning between the first portion and the second portion.

A clutch disk according to an aspect of embodiments includes the damper spring device described above. Further, the clutch disk comprises a first portion, secured to the input shaft of the gearbox and configured to rotate integrally with the input shaft, and a second portion supported on the first portion so as to be pivotable relative to the first portion around an axis of the input shaft of the gearbox and releasably pressed against the output shaft of the engine. The damper spring device is disposed spanning between the first portion and the second portion.

A clutch disk for lockup mechanism according to an aspect of embodiments includes the damper spring device described above. Further, the clutch disk for lockup mechanism comprises a first portion, secured to the input shaft of the gearbox and configured to rotate integrally with the input shaft, and a second portion supported on the first portion so as to be pivotable relative to the first portion around an axis of the input shaft of the gearbox and releasably pressed against a case of a torque converter which rotates integrally with the output shaft of the engine. The damper spring device is disposed spanning between the first portion and the second portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exploded sectional view showing the flywheel shown in FIG. 1;

FIG. 4 is a front view of a first portion shown in FIG. 2, taken in the direction of arrow F4;

FIG. 5 is an enlarged cutaway sectional view of a damper spring device shown in FIG. 4;

FIG. 8 is a graph showing stresses that act on the first and second springs with the damper spring device of the present embodiment subjected to a static load;

FIG. 9 is a graph showing stresses that act on the first and second springs with the damper spring device of the present embodiment subjected to a dynamic load;

FIG. 10 is a graph showing S-N curves obtained when a load at which the first spring is fully compacted is applied to the damper spring device of the present embodiment;

FIG. 11 is a sectional view showing how an axial load at which a first spring is fully compacted is applied to a damper spring device according to a second embodiment of the present invention;

FIG. 21 is a schematic view showing an engine, transmission, and clutch disk comprising damper spring devices according to a sixth embodiment of the present invention; and FIG. 22 is a schematic view showing an engine, torque converter, transmission, and clutch disk for lockup mechanism comprising damper spring devices according to a seventh embodiment of the present invention.

DETAILED DESCRIPTION OF THE INVENTION

A damper spring device according to a first embodiment of the present invention will be described with reference to FIGS. 1 to 9. In the present embodiment, an example of the damper spring device is used in a flywheel.

Figure 1:
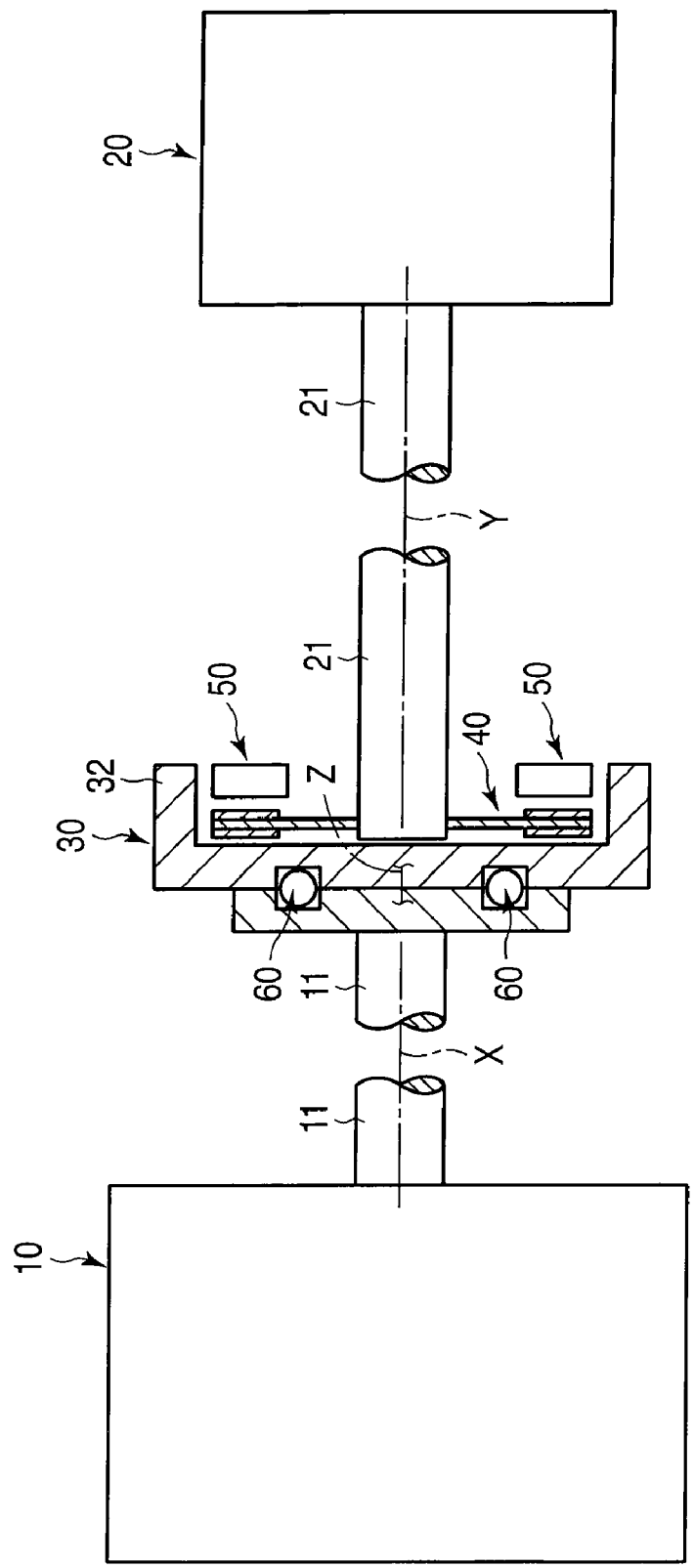
FIG. 1 is a schematic view showing an engine, transmission, and flywheel comprising damper spring devices according to a first embodiment of the present invention.

FIG. 1 is a schematic view showing an engine 10 and transmission 20 of, for example, an automobile with diesel engine. As shown in FIG. 1, a flywheel 30 is disposed on an end portion of a crankshaft 11 (a part of which is not shown) of the engine 10. In the transmission 20, a clutch disk 40 is disposed on an end portion, on the flywheel 30 side, of an input shaft 21 (a part of which is not shown) to which rotation of the engine 10 is input. Axis Y of the input shaft 21 is located on axis X of the crankshaft 11. The crankshaft 11 is an example of the output shaft of the engine according to the present invention.

Further, a pusher plate 50 that has a function to press the clutch disk 40 against the flywheel 30 is provided on the side of the transmission 20. The pusher plate 50 is driven by a drive mechanism (not shown) or the like and presses the clutch disk 40 against the flywheel 30.

When a driver of the automobile is not stepping on the clutch pedal (not shown), the drive mechanism presses the clutch disk 40 against the flywheel 30, If the driver steps on the clutch pedal, the drive mechanism releases the clutch disk 40 from its press. Thereupon, the clutch disk 40 separates from the flywheel 30.

When the clutch disk 40 is pressed against the flywheel 30, the clutch disk 40 is caused to rotate integrally with the flywheel 30 by friction produced between itself and the flywheel 30. Consequently, the input shaft 21 of the transmission 20 is integrally connected to the crankshaft 11 of the engine 10 through the flywheel 30 and clutch disk 40, so that the rotation of the engine 10 (rotation of the crankshaft 11) can be transmitted to the transmission 20.

Figure 3:
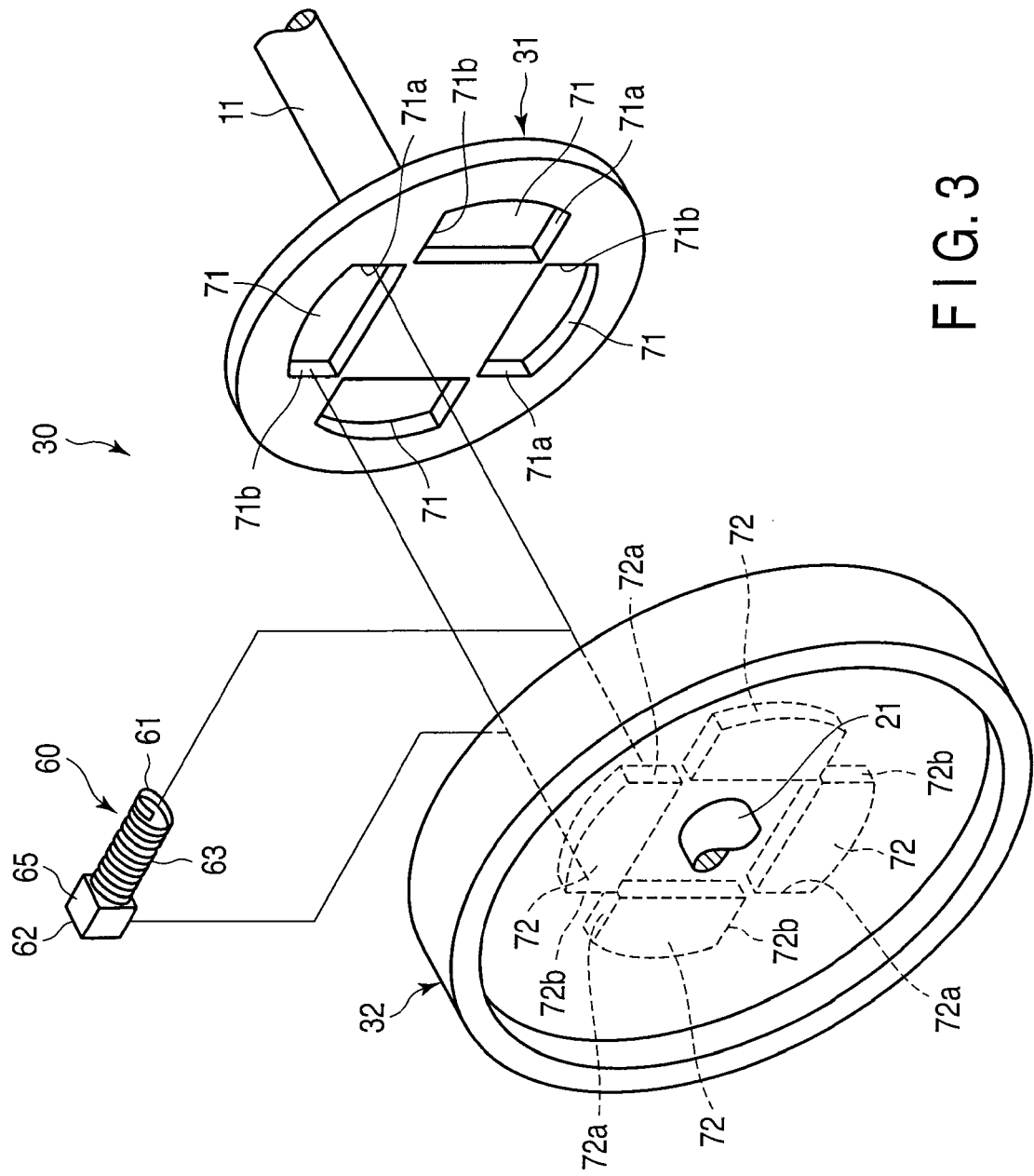
FIG. 3 is an exploded perspective view schematically showing the flywheel shown in FIG. 1.

The flywheel 30 will be described specifically. FIG. 2 is an exploded sectional view of the flywheel 30. FIG. 3 is an exploded perspective view schematically showing the flywheel 30.

As shown in FIGS. 1 to 3, the flywheel 30 comprises a first portion 31 integrally fixedly connected to the crankshaft 11, second portion 32, etc. The first portion 31 is not necessarily secured directly to the crankshaft 11. Depending on the engine, for example, the crankshaft 11 may be connected with another shaft member, to which the first portion 31 is fixedly connected. Thus, the first portion 31 is regarded as being secured to the crankshaft side (output shaft side of the engine) in either of cases where it is fixedly connected directly to the crankshaft 11 and where it is fixedly connected through the other shaft member.

As shown in FIG. 1, the second portion 32 is located on the opposite side of the first portion 31 to the engine 10 and connected to the first portion 31 so as to be pivotable relative to the first portion 31. Specifically, the second portion 32 is connected to the first portion 31 so as to be pivotable around the axes X and Y of the crankshaft 11 (output shaft of the engine) and the input shaft 21. Thus, axis Z of the rotary shaft of the second portion 32 is located on axes X and Y.

The clutch disk 40 is pressed against the second portion 32. The clutch disk 40 represents the input shaft side of the gearbox according to the present invention. The input shaft side is a concept that includes the input shaft or another member that is secured to the input shaft so as to be rotatable integrally with the input shaft.

In the flywheel 30, as shown in FIG. 2, the first portion 31 and second portion 32 are provided damper spring devices 60, which absorb a sudden torque change of the engine 10. The damper spring devices 60 are arranged spanning between the first and second portions 31 and 32. The following is a description of an example of a retaining structure for the damper spring devices 60.

FIG. 4 is a front view of the first portion 31 shown in FIG. 2, taken in the direction of arrow F4. As shown in FIG. 4, the first portion 31 is formed with groove portions 71, e.g., four, which contain the damper spring devices 60. As shown in FIG. 4, the first portion 31 is circular. The four groove portions 71 are arranged at regular circumferential intervals inside the first portion 31. In FIG. 4, the second portion 32 is indicated by a two-dot chain line.

As shown in FIG. 3, the second portion 32 is also formed with groove portions 72 that contain the damper spring devices 60. The second portion 32 is also circular, and the groove portions 72 are four in number and arranged at regular circumferential intervals.

When the first portion 31 and second portion 32 are connected to each other, as shown in FIG, 1, the groove portions 71 formed in the first portion 31 and the groove portions 72 formed in the second portion 32 face one another. Thus, storage spaces are defined by the groove portions 71 and 72. The damper spring devices 60 are contained spanning between the groove portions 71 in the first portion 31 and the groove portions 72 in the second portion 32 (or contained in the storage spaces). In other words, a part of each damper spring device 60 is contained in each corresponding groove portion 71, and the remaining part in each corresponding groove portion 72.

The respective substantially circumferential lengths of the groove portions 71 and 72 are equal. When the damper spring devices 60 are contained in the groove portions 71 and 72, as shown in FIG. 3, therefore, one end 61 of each damper spring device 60 in the direction of rotation of the second portion 32 relative to the first portion 31 simultaneously contacts one end 71a of each groove portion 71 and one end 72a of each groove portion 72, and the other end 62 of each damper spring device 60 simultaneously contacts the other end 71b of the groove portion 71 and the other end 71b of the groove portion 72.

The one end 72a of the groove portion 72 is an end that is located in a region that faces the one end 71a of the groove portion 71 of the first portion 31 when the second portion 32 is connected to the first portion 31. The other end 72b of the groove portion 72 is an end that is located in a region that faces the other end 71b of the groove portion 71 of the first portion 31 when the second portion 32 is connected to the first portion 31.

With this arrangement, the first portion 31 rotates integrally with the crankshaft 11 when the crankshaft 11 rotates, and this rotation is transmitted to the second portion 32 through the damper spring devices 60. One of the damper spring devices 60 is shown in FIG. 3 and the other damper spring devices 60 are omitted. Actually, however, the damper spring devices 60 are also contained in the other groove portions 71 and 72.

The retaining structure for the damper spring devices 60 is not limited to the above-described arrangement. In short, the damper spring devices 60 need only to be retained so as to be able to transmit the rotation of the first portion 31 to the second portion 32. Further, the damper spring devices 60 are not limited to four in number. For example, one is enough for the purpose. Alternatively, two, three, or some other plurality of devices 60 may be provided. If a plurality of damper spring devices 60 are provided, the damper spring devices 60 should preferably be arranged at regular intervals around the rotational axis of the second portion 32.

The following is a description of the structures of the damper spring devices 60. The damper spring devices 60 may share the same structure. Therefore, the structure of one of the damper spring devices 60 will be described representatively.

FIG. 5 is an enlarged cutaway sectional view of the damper spring device 60. As shown in FIG. 5, the damper spring device 60 comprises a first spring 63, which is a coil spring, and a preload unit 65 disposed in series with the first spring 63 along its axis 64.

The first spring 63 is located between the preload unit 65 and the one ends 71a and 72a of the groove portions 71 and 72. The first spring 63 is in a posture such that the axis 64 extends circumferentially relative to the axis of the crankshaft 11, that is, substantially in the rotational direction of the second portion 32.

Further, the first spring 63 is previously compressed along the axis 64. The length of the first spring 63 in a mounted state is S1. As stated herein, the mounting load of the first spring is a reaction force that is produced along the axis 64 with the length of the first spring 63 kept at S1 without being externally forced.

The preload unit 65 comprises a case 66, second spring 67, and movable spring seat 68 capable of movement. The case 66 is in the form of a cylinder having one end open and comprising a bottom wall portion 69 at the other end, for example. The second spring 67 is contained in the case 66. The second spring 67 is a coil spring and an axis 70 of the second spring 67 is located on the axis 64 of the first spring 63. Thus, the second spring 67 is located in series with the first spring 63.

Stopper 80 is formed on one end edge of the case 66. The stopper 80 is formed in such a manner that their edge portions project inward. In the case 66, the movable spring seat 68 is located between the second spring 67 and stopper 80. The movable spring seat 68 is in the form of a plate having an area larger than an opening defined by stopper 80. Thus, the movable spring seat 68 abuts the stopper 80, so that the second spring 67 is prevented from getting out through the opening. The movable spring seat 68 is movable along the axis of the second spring 67. One end of the first spring 63 is secured to the movable spring seat 68.

The second spring 67 is previously compressed along the axis 70 before it is contained in the case 66. In other words, the second spring 67 is previously loaded (or preloaded) as it is contained in the case 66 and is disposed between the bottom wall portion 69 and movable spring seat 68.

The length of the second spring 67 contained in the case 66 without being externally forced, that is, the length of the second spring 67 with the movable spring seat 68 in contact with the second spring 67 and in contact with the stopper 80, is assumed to be S2. The second spring 67 is confined to the case 66 by the stopper 80 so as not to be longer than S2.

The preload on the second spring 67 is set so that the second spring 67 starts to deform along the axis 70 when a load heavier than a predetermined load (or a load immediately after the predetermined load is exceeded) is applied along the axis 70 to the second spring 67. This predetermined load is an axial load that is obtained when a strand 63a that forms the first spring 63 is at least partially compacted and is heavier than the mounting load of the first spring 63. Thus, the predetermined load is set so that the second spring 67 starts to deform (or be compressed) when the load at which the strand 63a of the first spring 63 is at least partially compacted is exceeded thereby.

In other words, moreover, the first and second springs 63 and 67 have load-deflection characteristics such that the first spring 63 deforms when the input axial load (load along the axes 64 and 70) is less than the load at which the strand 63a of the first spring 63 is at least partially compacted and that the first spring 63 and second spring 67 deform when the axial load exceeds the load at which the strand 63a of the first spring 63 is at least partially compacted.

The following is a specific description of how the strand 63a of the first spring 63 is at least partially compacted. As shown in FIG. 5 and described above, the first spring 63 is a coil spring. Therefore, the interval (pitch) between the strand near the opposite ends of the first spring 63 is shorter than in other regions (e.g., at a longitudinal middle portion of the first spring 63). Specifically, there is a relation P1>P2, where P1 is the pitch at the middle portion, and P2 is the pitch near the opposite ends.

Thus, if the first spring 63 is deformed by a load along the axis 64 applied to the first spring 63, the turns of the strand 63a at the opposite ends with the shorter pitch first closely contact one another. This is a state in which the strand 63a is at least partially compacted, for example.

In the present embodiment, the first spring 63 is a flexible spring more deformable than the second spring 67. In addition, the first spring 63 is longer than the second spring 67. This is so in order that the flexible (more flexible than the second spring 67) first spring 63 can appropriately absorb the load to improve the spring characteristics of the damper spring device 60, thereby effectively absorbing the torque change of the engine 10.

The first spring 63 and second spring 67 is not limited to the above-described relationship. In short, the first and second springs 63 and 67 need only to have load-deflection characteristics set so that only the first spring 63 deforms (or compressed) until the strand 63a that forms the first spring 63 is at least partially compacted and that the first and second springs 63 and 67 deform after the strand 63a of the first spring 63 is at least partially compacted.

The following is a description of the action of the flywheel 30.

If the engine 10 is powered (or rotated), the crankshaft 11 rotates. When the driver's foot is not on the clutch pedal, the clutch disk 40 is pressed against the flywheel 30 by the pusher plate 50. Thus, the rotation of the crankshaft 11 is transmitted to the transmission 20 through the flywheel 30 and clutch disk 40.

Depending on the operating state of the automobile, the torque of the engine 10 suddenly changes if the driver suddenly steps on an accelerator pedal, for example. Accordingly, the rotational frequency of the crankshaft 11 suddenly changes. If the torque change is transmitted to the transmission 20 in this state, various types of gears in the transmission 20 may produce rattling noise.

However, the sudden torque change is absorbed by the damper spring device 60. Specifically, torque displacement is slowly transmitted to the second portion 32 as the damper spring device 60 is compressed between the first portion 31 and second portion 32. Thus, the torque displacement can be slowly transmitted to the transmission 20.

The following is a specific description of this point. As the torque of the engine 10 suddenly changes, the rotational frequency of the first portion 31 suddenly changes (this change involves both an increase and decrease). As a result, a difference is produced between the rotational frequency of the first portion 31 and the rotational frequency of the second portion 32. Consequently, the opposite ends 71a and 71b of the first portion 31 and the opposite ends 72a and 72b of the second portion 32 are gradually dislocated.

In the damper spring device 60, the axes 64 and 70 of the first and second springs 63 and 67 are located substantially in the rotational direction of the first and second portions 31 and 32. Due to the dislocation of the opposite ends 71a, 71b, 72a and 72b of the groove portions 71 and 72, therefore, the damper spring device 60 is compressed along the axes 64 and 70 of the first and second springs 63 and 67.

Figure 6:
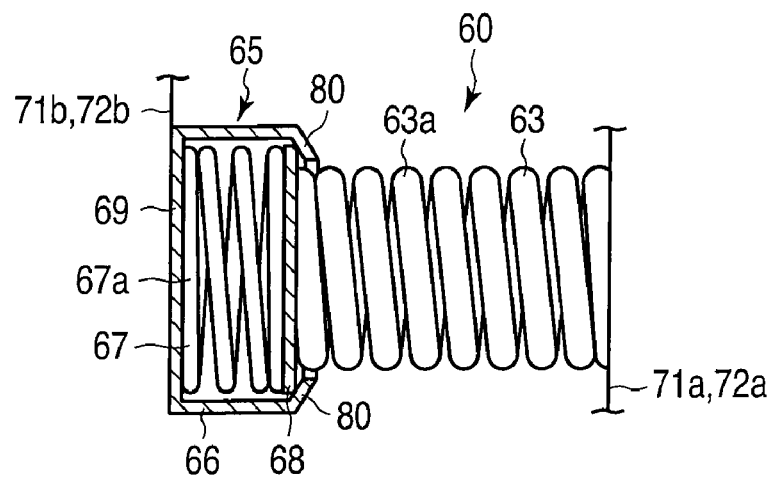
FIG. 6 is a sectional view showing how a strand of a first spring of the damper spring device shown in FIG. 5 is partially compacted.

First, the first spring 63 deforms (or is compressed). If the compressive load then reaches a predetermined value, the turns of the strand 63a at the opposite ends with the shorter pitch closely contact one another, as shown in FIG. 6. Thus, the strand 63a is partially compacted.

Figure 7:
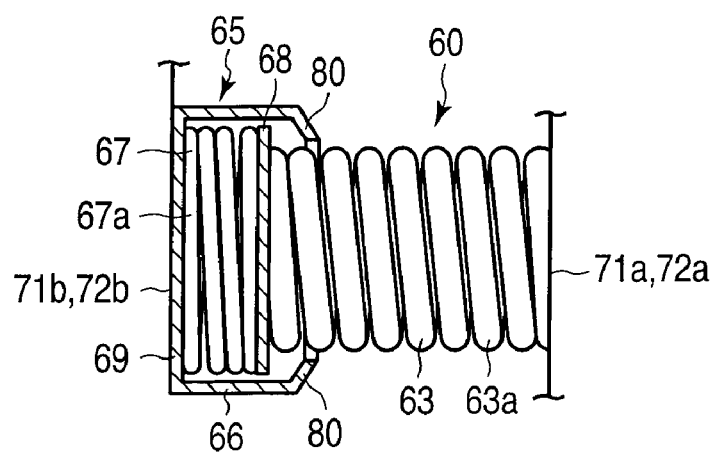
FIG. 7 is a sectional view showing how a second spring shown in FIG. 6 deforms.

As shown in FIG. 7, the second spring 67, along with the first spring 63, starts to deform (or be compressed) the moment the strand 63a of the first spring 63 is partially compacted in the above-described manner. If a heavier load is applied, thereafter, the first spring 63 is fully compacted. The fully compacted state described herein is a state in which the turns of the strand of the spring fully closely contact one another and cannot further deform.

The value of a load at which the second spring 67 is fully compacted is set to be greater than the value of the load at which the first spring 63 is fully compacted. Further, the second spring 67 is set so that it cannot be fully compacted if the torque suddenly changes during normal drive of the automobile. This setting is made based on results of experiments, for example.

Soon after the torque is changed, the rotational frequency of the second portion 32 then gradually approaches the rotational frequency of the first portion 31. Also, the load acting on the damper spring device 60 is gradually reduced, so that the first and second springs 63 and 67 are restored to their respective original lengths. In this way, the sudden torque change of the engine 10 is slowly transmitted to the transmission 20.

If the axial load applied to the damper spring device 60 (or a load applied along the axes 64 and 70 of the first and second springs 63 and 67) is a shock wave, which is a sudden heavy load, surging may be caused in the first and second springs 63 and 67.

When the second spring 67 is also deformed by a heavy load, however, the surging can be confined to the second spring 67. If the surging is caused in the first spring 63, moreover, the strand 63a of the first spring 63 is at least partially compacted. Therefore, displacement along the axis 64 is restricted at the compacted regions.

In the flywheel 30 constructed in this manner, a part of the first spring 63 is bound by the above-described action, so that the influence of surging can be suppressed. The following is a specific description of this point. A state in which surging is not caused in the first and second springs 63 and 67 will be described first. FIG. 8 is a graph showing stresses that act on the first and second springs 63 and 67 with the damper spring device 60 subjected to a static load. The static load is a load whose input value gradually increases without causing surging.

The abscissa of FIG. 8 represents the passage of time. The ordinate represents the magnitude of stress. Since the second spring 67 is preloaded, its stress is higher than that of the first spring 63, as shown in FIG. 8.

Since the first spring 63 is first deformed (or compressed) by the static load, only the stress on the first spring 63 increases with the passage of time. If the load then reaches a value such that the first spring 63 is partially compacted, the second spring 67 also starts to deform.

If the load further increases, the first spring 63 is fully compacted, and the first spring 63 ceases to deform (or the stress ceases to change). If the load additionally increases, the second spring 67 further deforms. If a peak load (torque change) is exceeded, the stresses on the first and second springs 63 and 67 are reduced.

The following is a description of a state in which surging occurs. FIG. 9 shows a state in which a dynamic load that causes surging in the first and second springs 63 and 67 is applied to the damper spring device 60. The application of the dynamic load implies application of a sudden heavy load. The abscissa and ordinate of FIG. 9 are identical to those of FIG. 8. As shown in FIG. 9, the stresses acting on the first and second springs 63 and 67 are slightly changed by the occurrence of surging. This change, however, is relatively small. Thus, the influence of the surging can be suppressed. When the second spring 67 deforms, the first spring 63 is partially compacted, and displacement of the compacted regions is suppressed. Even if the first spring 63 is subjected to surging, therefore, its displacement can be suppressed by the compacted state. Even if surging occurs in the second spring 67, moreover, the stopper 80 can prevent it from being propagated to the first spring 63, thereby suppressing the influence of the surging.

Furthermore, the second spring 67 deforms (or is compressed) after the strand 63a of the first spring 63 is at least partially compacted. In this way, the load further applied after the strand 63a of the first spring 63 is at least partially compacted is absorbed by deformation of the second spring 67 and the remaining part (uncompacted part) of the first spring 63.

Consequently, an excessive load can be prevented from being applied to the compacted regions. Thus, the strand 63a can be prevented from being spread or friction can be prevented from being produced between the compacted turns of the strand 63a, so that the first spring 63 can be prevented from being damaged.

Further, the second spring 67 is fully compacted when a load heavier than the load at which the first spring 63 is fully compacted is applied. In addition, the second spring 67 is set so that it cannot be fully compacted during normal drive. Even if a further load is applied after the first spring 63 is fully compacted, therefore, the further load is absorbed by the second spring 67. Consequently, the first spring 63 can be prevented from being damaged.

FIG. 10 shows S-N curves obtained when a load at which the first spring 63 is fully compacted is applied to the damper spring device 60. As shown in FIG. 10. The damper spring device 60 of the present embodiment can be prevented from being damaged.

Further, for a conventional damper spring device with only a single coil spring (a damper spring device without the first and second springs 63 and 67 arranged in series, as in the present invention), as shown in FIG. 10, the S-N diagram does not include results of a test in which a load at which the single coil spring is fully compacted is applied a plurality of times. This is because dislocation of the strand attributable to the fully compacted state of the coil spring cannot be absorbed. FIG. 10 also shows results of a test in which a load at which the coil spring of the conventional damper spring device is not in the compacted state (which is a concept including both fully and partially compacted states) is applied a plurality of times.

In the damper spring device 60, moreover, the first and second springs 63 and 67 are arranged in series, whereby operating regions are assigned to the first and second springs 63 and 67. In this way, the stress amplitudes of the first and second springs 63 and 67 can be restricted, so that the durability of the first and second springs 63 and 67 is improved.

Figure 12:
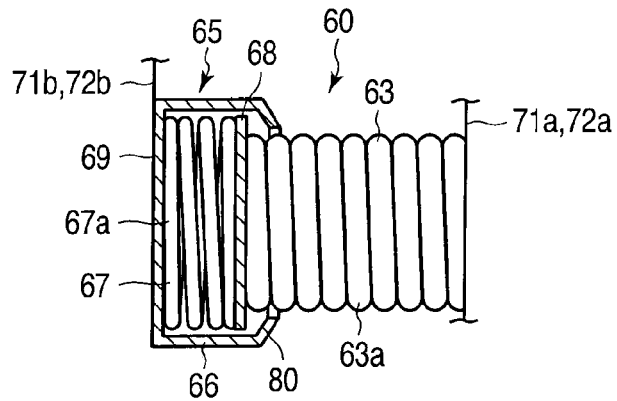
FIG. 12 is a sectional view showing how a second spring of the damper spring device shown in FIG. 11 deforms.

A damper spring device according to a second embodiment of the present invention will now be described with reference to FIGS. 11 and 12. Like numbers used in the first embodiment refer to those configurations which have the same functions as those of the first embodiment, and a description of those configurations is omitted. The present embodiment differs from the first embodiment in the preload previously applied to the second spring 67. For other particulars, the present embodiment may be the same as the first embodiment. The following is a specific description of the above different point.

In the present embodiment, the preload previously applied to the second spring 67 is a load having just exceeded the load at which the first spring 63 is fully compacted. In other words, the second spring 67 starts to deform (or be compressed) when the load at which the first spring 63 is fully compacted is exceeded by the axial load applied to the damper spring device 60.

The following is a description of the action of the damper spring device 60 of the present embodiment. FIG. 11 shows a state in which a load along the axes 64 and 70 of the first and second springs 63 and 67 is applied to the damper spring device 60 as the torque of the engine 10 suddenly changes.

As shown in FIG. 11, the second spring 67 does not deform before the first spring 63 is fully compacted. The second spring 67 starts to deform when the load at which the first spring 63 is fully compacted is exceeded by the axial load, as shown in FIG. 12.

The present embodiment is configured so that the second spring 67 starts to deform (or be compressed) after the first spring 63 is fully compacted. Thus, surging may be caused if such a great torque change as to deform the second spring 67 occurs. Since the displacement of the first spring 63 is restricted due to the fully compacted state of the first spring 63, however, the surging can be neutralized.

Thus, in the present embodiment, the influence of surging can be further suppressed in addition to the effect of the first embodiment.

A damper spring device according to a third embodiment of the present invention will now be described with reference to FIG. 13. Like numbers used in the first and second embodiments refer to those configurations which have the same functions as those of the first and second embodiments, and a description of those configurations is omitted.

The present embodiment differs from the first and second embodiments in the configuration of the second spring 67. For other configurations, the present embodiment may be the same as the first and second embodiments. The following is a specific description of the above different configuration.

Figure 13:
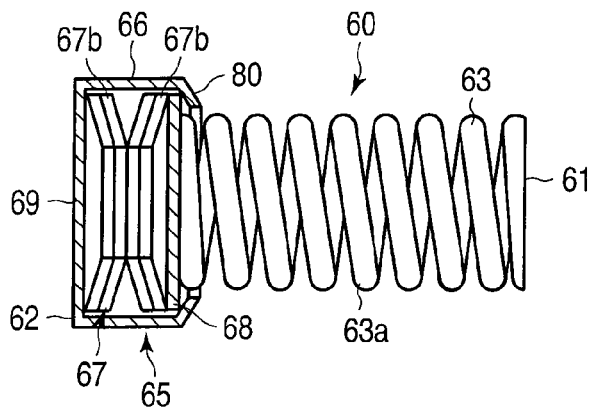
FIG. 13 is a sectional view showing a damper spring device according to a third embodiment of the present invention.

According to the present embodiment, as shown in FIG. 13, the second spring 67 is a disk spring. In the present embodiment, for example, two disk springs 67b are arranged in series with each other.

Also in the case of the present embodiment where the second spring 67 is formed of the disk springs 67b, a preload previously applied to the second spring 67 may be the same as in the first embodiment. In this case, the second spring 67 has the same function as that of the second spring 67 (formed of a coil spring) described in connection with the first embodiment, and can therefore provide the same effects as in the first embodiment.

Alternatively, the preload applied to the second spring 67 of the present embodiment may be the same as in the second embodiment. In this case, the second spring 67 has the same function as that of the second spring 67 (formed of a coil spring) described in connection with the second embodiment, and can therefore provide the same effects as in the second embodiment.

A damper spring device according to a fourth embodiment of the present invention will now be described with reference to FIG. 14. Like numbers used in the first and second embodiments refer to those configurations which have the same functions as those of the first and second embodiments, and a description of those configurations is omitted.

The present embodiment differs from the first and second embodiments in the configuration of the second spring 67. For other configurations, the present embodiment may be the same as the first and second embodiments. The following is a specific description of the above different configuration.

Figure 14:
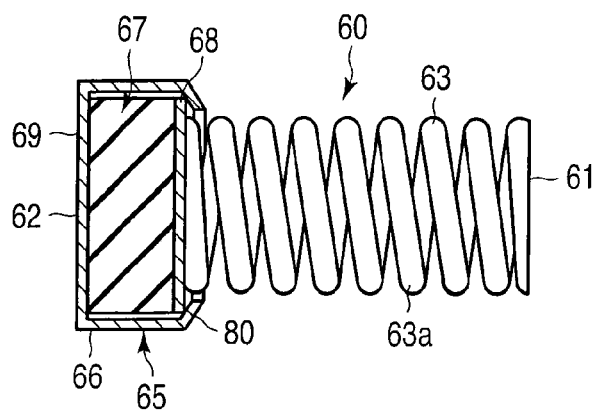
FIG. 14 is a sectional view showing a damper spring device according to a fourth embodiment of the present invention.

According to the present embodiment, as shown in FIG. 14, the second spring 67 is an elastic member of resin. Also in the case of the present embodiment where the second spring 67 is formed of resin, a preload previously applied to the second spring 67 may be the same as in the first embodiment. In this case, the second spring 67 has the same function as that of the second spring 67 (formed of a coil spring) described in connection with the first embodiment, and can therefore provide the same effects as in the first embodiment.

Alternatively, the preload applied to the second spring 67 of the present embodiment may be the same as in the second embodiment. In this case, the second spring 67 has the same function as that of the second spring 67 (formed of a coil spring) described in connection with the second embodiment, and can therefore provide the same effects as in the second embodiment.

The resin according to the present embodiment is elastic resin including rubber or the like. This resin is an example of the nonmetallic elastic member according to the present invention. Further, the nonmetallic elastic member is not limited to resin. The shape is not limited either. In short, the elastic member is only expected to be sufficiently elastic to function as the second spring.

A damper spring device according to a fifth embodiment will now be described with reference to FIGS. 15 to 20. Like numbers used in the first and second embodiments refer to those configurations which have the same functions as those of the first and second embodiments, and a description of those configurations is omitted.

The present embodiment differs from the first and second embodiments in comprising a third spring. For other configurations, the present embodiment may be the same as the first and second embodiments. The following is a specific description of the above different configuration.

Figure 15:
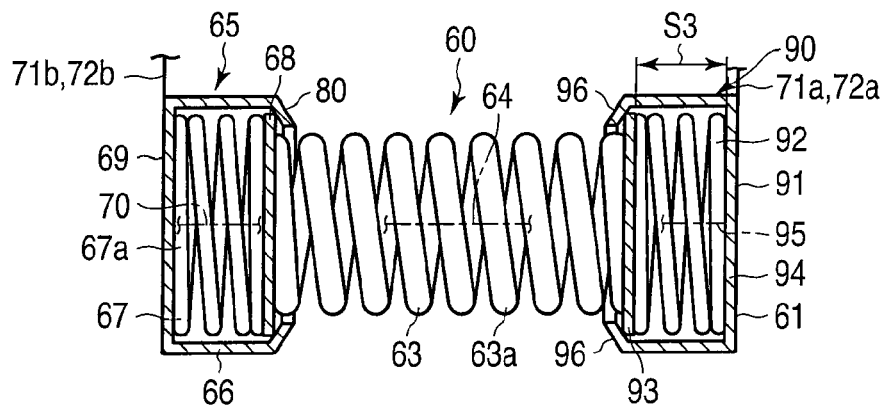
FIG. 15 is a sectional view showing a damper spring device according to a fifth embodiment of the present invention.

FIG. 15 is a cutaway sectional view showing a damper spring device 60 according to the present embodiment. As shown in FIG. 15, a second preload unit 90 is located in series at the opposite end of a first spring 63 to a preload unit 65.

The second preload unit 90 comprises a second case 91, third spring 92, and second movable spring seat 93 capable of movement. The second case 91 is in the form of a cylinder having one end open and comprising a bottom wall portion 94 at the other end, for example. The third spring 92 is contained in the second case 91. The third spring 92 is a coil spring and an axis 95 of the third spring 92 is located on axes 64 and 70 of first and second springs 63 and 67. Thus, the third spring 92 is located in series with the first spring 63.

Second stopper 96 is formed on one end edge of the second case 91. The second stopper 96 is formed in such a manner that their edge portions project inward. In the second case 91, the second movable spring seat 93 is located between the third spring 92 and second stopper 96. The second movable spring seat 93 is in the form of a plate having an area larger than an opening defined by the second stopper 96. Thus, the second movable spring seat 93 abuts the second stopper 96, so that the third spring 92 is prevented from getting out through the opening. The second movable spring seat 93 is movable along the axis 95 of the third spring 92. The other end of the first spring 63 is secured to the second movable spring seat 93.

The third spring 92 is previously compressed along the axis 95 before it is contained in the second case 91. In other words, the third spring 92 is previously loaded (or preloaded) as it is contained in the second case 91 and is disposed between the bottom wall portion 94 and movable spring seat 93.

The length of the third spring 92 contained in the second case 91 without being externally forced, that is, the length of the third spring 92 with the movable spring seat 93 in contact with the third spring 92 and in contact with the stopper 96, is assumed to be S3. The third spring 92 is confined to the second case 91 by the second stopper 96 so as not to be longer than S3.

A preload on the third spring 92 is set so that the third spring 92 starts to deform when a load at which a strand 67a of the second spring 67 is at least partially compacted is exceeded by an axial load acting on the third spring 92, for example. In other words, the preload on the third spring 92 is a load having just exceeded the load at which the strand 67a of the second spring 67 is at least partially compacted. The partially compacted state described herein is the same as the one described in connection with the first spring 63. The way the third spring 92 starts to deform when the load at which the second spring 67 is partially compacted is exceeded is an example of how the third spring deforms after the second spring starts to deform according to the present invention.

Alternatively, the preload on the third spring 92 may be set so that the third spring 92 starts to deform when a load at which the strand 67a of the second spring 67 is fully compacted is exceeded by the axial load acting on the third spring 92. In other words, the preload on the third spring 92 is a load having just exceeded the load at which the strand 67a of the second spring 67 is fully compacted. The fully compacted state described herein is the same as the one described in connection with the first spring 63. The way the third spring 92 starts to deform when the load at which the second spring 67 is fully compacted is exceeded is an example of how the third spring deforms after the second spring starts to deform according to the present invention.

Alternatively, the preload on the third spring 92 may be set so that the third load starts to deform the moment the second spring 67 starts to deform.

The second preload unit 90 constructed in this manner may be used in the damper spring device 60 described in connection with the first embodiment. Alternatively, it may be used in the damper spring device 60 described in connection with the second embodiment.

Figure 16:
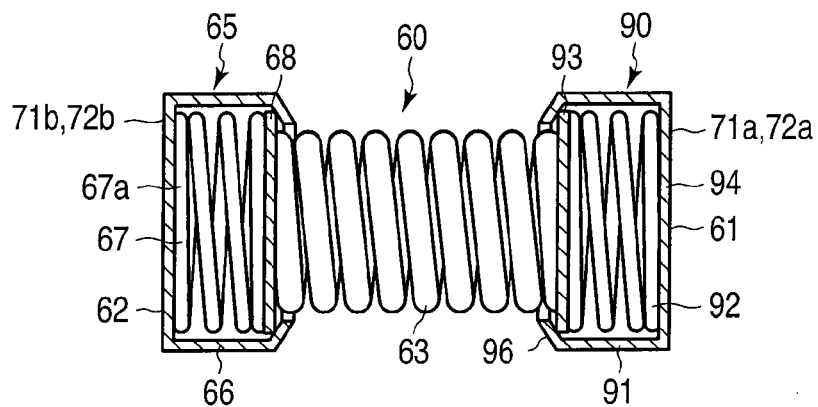
FIG. 16 is a sectional view illustrating the operation of the damper spring device shown in FIG. 15.
Figure 17:
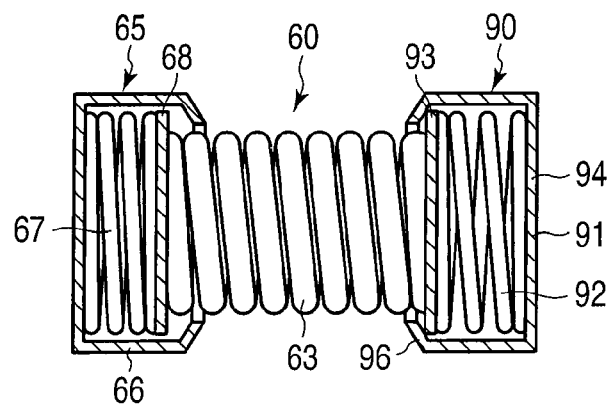
FIG. 17 is a sectional view illustrating the operation of the damper spring device shown in FIG. 15.
Figure 18:
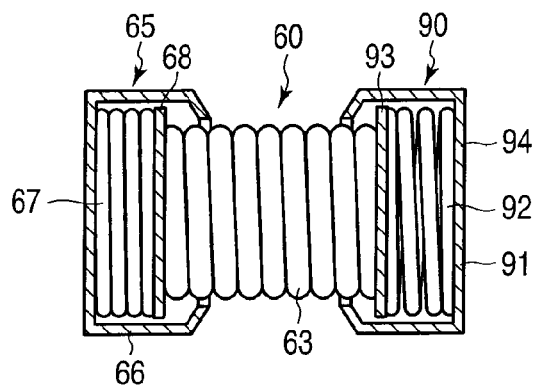
FIG. 18 is a sectional view illustrating the operation of the damper spring device shown in FIG. 15.

The following is a description of an example of an operation performed in the case where the second preload unit 90 of the present embodiment is used in the damper spring device 60 described in connection with the first embodiment. As shown in FIG. 16, the first spring 63 deforms first. When the load at which the strand 63a of the first spring 63 is at least partially compacted is then exceeded by an axial load acting on the damper spring device 60, the second spring 67 starts to deform, so that the first and second springs 63 and 67 deform, as shown in FIG. 17.

If the axial load then exceeds the load at which the strand 67a of the second spring 67 is at least partially compacted, the third spring 92 starts to deform, so that the first to third springs 67, 67 and 92 deform. Alternatively, the third spring 92 may be configured to start to deform when the load at which the strand 67a of the second spring 67 is fully compacted is exceeded by the axial load. Alternatively, the third spring 92 may be configured to start to deform the moment the second spring 67 starts to deform.

The second preload unit 90 is also operated in the above-described manner if the second preload unit 90 is used in the damper spring device 60 described in connection with the second embodiment.

Figure 19:
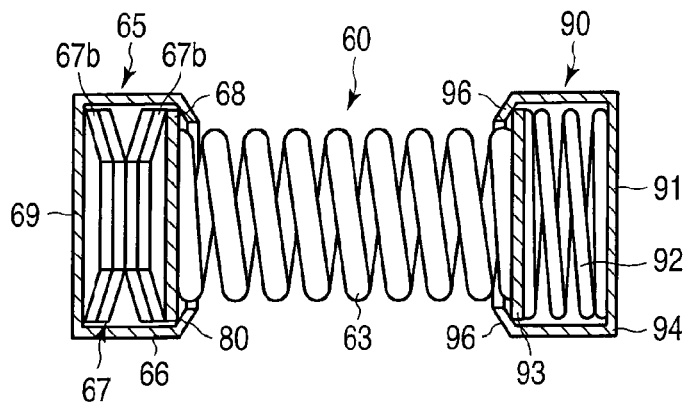
FIG. 19 is a sectional view showing how a disk spring is used for a second spring of the damper spring device according to the fifth embodiment of the present invention.
Figure 20:
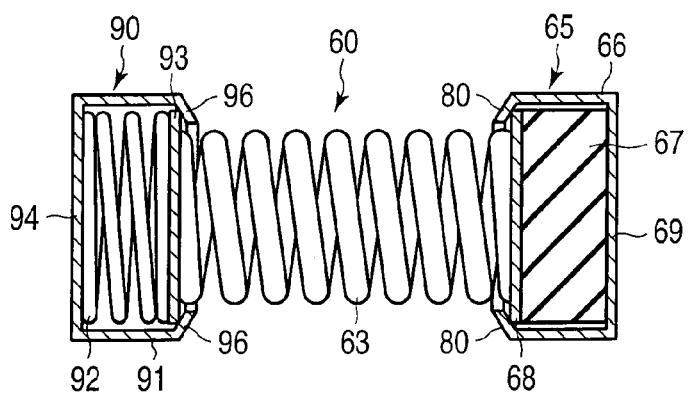
FIG. 20 is a sectional view showing how a nonmetallic elastic member is used for the second spring of the damper spring device according to the fifth embodiment of the present invention.

Further, the second preload unit 90 may also be used in the damper spring devices 60 described in connection with the third and fourth embodiments. FIG. 19 shows a case where the second preload unit 90 is used in the damper spring device (in which the second spring 67 is a disk spring) described in connection with the third embodiment. FIG. 20 shows a case where the second preload unit 90 is used in the damper spring device (in which the second spring 67 is a nonmetallic elastic member) described in connection with the fourth embodiment.

In these cases, the preload on the third spring 92 is set so that the third spring 92 starts to deform when a load at which the second spring 67 (disk spring or nonmetallic) deforms to a predetermined degree is exceeded by the axial load.

Thus, the second preload unit 90 can be used in any of the damper spring devices 60 described in connection with the first to fourth embodiments, and the load characteristics of the damper spring device 60 can be set in three phases in addition to the effect of the first to fourth embodiments. Even if a sudden torque change occurs in the engine 10, therefore, displacement of the torque can be smoothly transmitted to the transmission 20.

Although the third spring 92 is a coil spring in the present embodiment, it is not limited to this. For example, the third spring 92 may be a disk spring, such as the one used in the third embodiment. Alternatively, it may be a nonmetallic elastic member, such as the one used in the fourth embodiment.

A damper spring device according to a sixth embodiment will now be described with reference to FIG. 21. Like numbers refer to those configurations which have the same functions as those of the first to fifth embodiments, and a description of those configurations is omitted. The present embodiment is different in that damper spring devices 60 are provided in a clutch disk 40, not in a flywheel 30. In other words, the clutch disk 40 comprises the damper spring devices 60 according to the present embodiment. For other particulars, the present embodiment may be the same as the first to fifth embodiments. The following is a specific description of the above different configuration.

FIG. 21 is a schematic view showing an engine 10 and transmission 20 of, for example, an automobile with diesel engine, according to the present embodiment. As shown in FIG. 21, the clutch disk 40 comprises the damper spring devices 60. The flywheel 30 does not comprise the damper spring devices 60.

The clutch disk 40 comprises a first portion 41, integrally fixedly connected to an input shaft 21 of the transmission 20 and configured to rotate integrally with the input shaft 21, second portion 42, etc. The first portion 41 is not necessarily secured directly to the input shaft 21.

As shown in FIG. 21, the second portion 42 is located on the flywheel 30 side of the first portion 41 and connected to the first portion 41 so as to be pivotable relative to the first portion 41 around respective axes X and Y of the crankshaft 11 and input shaft 21. Thus, axis A of the rotary shaft of the second portion 42 is located on axes X and Y.

The second portion 42 is pressed against the flywheel 30 by a pressure plate 50. The flywheel 30 represents the output shaft side of the engine according to the present invention. The output shaft side is a concept that includes an output shaft (crankshaft 11) or another member that is secured to the output shaft so as to be rotatable integrally with the output shaft. As the second portion 42 is pressed against the flywheel 30, the rotation of the crankshaft 11 is transmitted to the transmission 20 through the clutch disk 40.

The first portion 41 is formed with groove portions 71, and the second portion 42 with groove portions 72. The groove portions 71 and 72 are constructed in the same manner as those of the first to sixth embodiments, and the damper spring devices 60 are held in the same manner as those of the first to fifth embodiments. Specifically, the damper spring devices 60 are arranged so as to be compressed (or deform) due to a relative deviation (a rotational difference) between the first and second portions 41 and 42, thereby absorbing a load. The damper spring devices described in connection with the first to sixth embodiments are available as the damper spring devices 60 used in this case.

The present embodiment can provide the same functions and effects as the first to fifth embodiments.

A damper spring device according to a seventh embodiment will now be described with reference to FIG. 22. Like numbers refer to those configurations which have the same functions as those of the first to fifth embodiments, and a description of those configurations is omitted. In the present embodiment, the damper spring devices 60 are provided in a clutch disk for lockup mechanism of an automobile with a torque converter, not in a flywheel 30. In other words, the clutch disk for lockup mechanism comprises the damper spring devices 60 according to the present embodiment. For other particulars, the present embodiment may be the same as the first to fifth embodiments. The following is a specific description of the above different configuration.

FIG. 22 is a schematic view showing an engine 10 and transmission 20 of, for example, an automobile, according to the present embodiment. In the present embodiment, as shown in FIG. 22, the engine 10 and transmission 20 are connected to each other by a torque converter 100.

The torque converter 100 comprises a case 101 secured to a crankshaft 11 and configured to rotate integrally with the crankshaft 11, pump impeller 102 contained in the case 101, turbine impeller 103 contained in the case 101, and clutch disk 200 for lockup mechanism.

The pump impeller 102 is secured to, for example, the case 101, so that it can rotate integrally with the crankshaft 11. The turbine impeller 103 is secured to an input shaft 21 of the transmission 20 so as to be rotatable therewith. A stator 104 is located between the pump impeller 102 and turbine impeller 103.

The turbine impeller 103 is activated by a flow of a working fluid, such as oil, as the pump impeller 102 rotates, whereby rotation of the engine 10 is transmitted to the transmission 20.

The clutch disk 200 for lockup mechanism is contained in the case 101 and comprises a first portion 201, integrally fixedly connected to the input shaft 21 of the transmission 20 and configured to rotate integrally with the input shaft 21, second portion 202, etc. The first portion 201 is not necessarily secured directly to the input shaft 21.

The second portion 202 is located on the crankshaft 11 side of the first portion 201 (on the opposite side to the pump impeller 102 and turbine impeller 103) and connected to the first portion 201 so as to be pivotable relative to the first portion 201 around respective axes X and Y of the crankshaft 11 and input shaft 21. Thus, axis B of the rotary shaft of the second portion 202 is located on axes X and Y.

If the automobile speed is higher than a predetermined speed, according to the present embodiment, the second portion 202 can be pressed against the inner surface of the case 101 by a drive mechanism (not shown) and released from the press. The case 101 represents the output shaft side of the engine according to the present invention. The output shaft side is a concept that includes an output shaft or another member that is secured to the output shaft so as to be rotatable integrally with the output shaft.

As the second portion 202 is pressed against the case 101, the crankshaft 11 and input shaft 21 are connected by the clutch disk 200 for lockup mechanism. Thereupon, rotation of the crankshaft 11 is transmitted to the transmission 20 through the clutch disk 200 for lockup mechanism.

The first portion 201 is formed with groove portions 71, and the second portion 202 with groove portions 72. The groove portions 201 and 202 are constructed and the damper spring devices 60 are held in the same manner as those of the first to sixth embodiments. Specifically, the damper spring devices 60 are arranged so as to be compressed (or deform) due to a relative deviation (or a rotational difference) between the first and second portions 201 and 202, thereby absorbing a load. The damper spring devices described in connection with the first to sixth embodiments are available as the damper spring devices 60 used in this case.

The present embodiment can provide the same functions and effects as the first to sixth embodiments. The structure of the torque converter 100 is not restricted. In short, the above effects can be obtained by using the damper spring devices of the present invention in the clutch disk for lockup mechanism.

It is to be understood, in carrying out the present invention, that the constituent elements of the present invention may be appropriately modified.

The present invention can provide a damper spring device capable of suppressing breakage and the influence of surging.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A damper spring device provided between an output shaft of an engine and an input shaft of a gearbox, the damper spring device comprising:
    a first spring comprising a coil spring and deformable in a rotational direction of the output shaft of the engine and the input shaft of the gearbox; and
    a second spring located in series with the first spring, on one side of the first spring, capable of being compressed along an axis of the first spring, and configured to be retained by a stopper in such a manner that the second spring is compressed by a preload along the axis,
    the preload on the second spring being greater than a mounting load of the first spring,
    the first spring and the second spring having load-deflection characteristics such that the first spring deforms when an axial load acting in the direction of compression of the first spring is not greater than a load at which a strand of the first spring is at least partially compacted and that the first spring and the second spring deform when the axial load is greater than the load at which the strand of the first spring is at least partially compacted.

2. The damper spring device according to claim 1, wherein the preload on the second spring is set so that the second spring deforms when a load at which the strand of the first spring is fully compacted is exceeded by the axial load.

3. The damper spring device according to claim 2, wherein the second spring is a coil spring.

4. The damper spring device according to claim 2, wherein the second spring is a disk spring.

5. The damper spring device according to claim 2, wherein the second spring is a nonmetallic elastic member.

6. The damper spring device according to claim 2, comprising a third spring capable of being compressed along the axis of the first spring on the opposite side of the first spring to the second spring and configured to be retained by a stopper in such a manner that the third spring is compressed by a preload along the axis, the preload on the third spring being greater than the mounting load of the first spring and set so that the third spring deforms the moment the second spring starts to deform or after the second spring starts to deform.

7. The damper spring device according to claim 1, wherein the second spring is a coil spring.

8. The damper spring device according to claim 1, wherein the second spring is a disk spring.

9. The damper spring device according to claim 1, wherein the second spring is a nonmetallic elastic member.

10. The damper spring device according to claim 1, comprising a third spring capable of being compressed along the axis of the first spring on the opposite side of the first spring to the second spring and configured to be retained by a stopper in such a manner that the third spring is compressed by a preload along the axis, the preload on the third spring being greater than the mounting load of the first spring and set so that the third spring deforms the moment the second spring starts to deform or after the second spring starts to deform.

11. A flywheel comprising:
the damper spring device according to claim 1;
a first portion secured to the output shaft of the engine and configured to rotate integrally with the output shaft; and
a second portion which is supported on the first portion so as to be pivotable relative to the first portion around an axis of the output shaft of the engine and against which the input shaft side of the gearbox is releasably pressed,
the damper spring device being disposed spanning between the first portion and the second portion.

12. A clutch disk comprising:
the damper spring device according to claim 1;
a first portion secured to the input shaft of the gearbox and configured to rotate integrally with the input shaft; and
a second portion supported on the first portion so as to be pivotable relative to the first portion around an axis of the input shaft of the gearbox and releasably pressed against the output shaft of the engine,
the damper spring device being disposed spanning between the first portion and the second portion.

13. A clutch disk for lockup mechanism, comprising:
the damper spring device according to claim 1;
a first portion secured to the input shaft of the gearbox and configured to rotate integrally with the input shaft; and
a second portion supported on the first portion so as to be pivotable relative to the first portion around an axis of the input shaft of the gearbox and releasably pressed against a case of a torque converter which rotates integrally with the output shaft of the engine,
the damper spring device being disposed spanning between the first portion and the second portion.

* * * * *